United States Patent [19]

Ganser et al.

[11] Patent Number: 4,937,501
[45] Date of Patent: Jun. 26, 1990

[54] CIRCUIT ARRANGEMENT FOR STARTING A HIGH-PRESSURE GAS DISCHARGE LAMP

[75] Inventors: Hans-Günther Ganser; Hans-Peter Stormberg, both of Stolberg, Fed. Rep. of Germany

[73] Assignee: U.S. Philips Corporation, New York, N.Y.

[21] Appl. No.: 238,022

[22] Filed: Aug. 29, 1988

[30] Foreign Application Priority Data

Sep. 3, 1987 [DE] Fed. Rep. of Germany ....... 3729383

[51] Int. Cl.⁵ ............................................. H05B 41/36
[52] U.S. Cl. ................................ 315/209 R; 315/291; 315/DIG. 7
[58] Field of Search ................... 315/209 R, 219, 291, 315/326, DIG. 7

[56] References Cited

U.S. PATENT DOCUMENTS 4,128,789 12/1978 Owen .............................. 315/209 R Primary Examiner—David Mis
Attorney, Agent, or Firm—Robert T. Mayer

[57] ABSTRACT

In a circuit arrangement for starting and operating a high-pressure gas discharge lamp (8) by means of a voltage converter comprising at least one semiconductor switch (5, 6), which can be switched periodically to the conductive and to the non-conductive state by a control unit (32, 33, 34) in such a manner that the lamp receives a pulsatory supply current having an operating duty cycle between 0.1 and 0.7, the control unit (32, 33, 34) switches the semiconductor switch (5, 6) upon starting of the lamp (8) in such a manner that the duty cycle upon starting (starting duty cycle) is increased with respect to the operating duty cycle.

15 Claims, 5 Drawing Sheets

CIRCUIT ARRANGEMENT FOR STARTING A HIGH-PRESSURE GAS DISCHARGE LAMP

The invention relates to a circuit arrangment for starting and operating a high-pressure gas discharge lamp by means of a voltage converter comprising at least one semi-conductor switch, which can be switched periodically to the conductive and to the non-conductive state in such a manner that the lamp receives a pulsatory supply current having a duty cycle in the operating condition (operating duty cycle) between 0.1 and 0.7. A pulsatory supply current is to be understood herein to mean a lamp current with both unipolar and bipolar pulses. A pulsatory lamp current is attained by supplying the lamp with a pulsatory voltage. The duty cycle of the current and that of the voltage are equal to each other.

Such a circuit arrangement is known, for example, from U.S. Pat. No. 4,128,789. In this case, a device for operating high-pressure sodium vapour discharge lamps using a pulsatory direct current, i.e. unipolar pulses, is concerned. Use is made of pulse train frequencies between 50 Hz and 23 kHz with a duty cycle between 0.08 and 0.8. The supply current does not return to zero between the individual pulses; a so-called hold current is rather maintained.

A problem of lamp operation with a pulsatory supply voltage consists in starting the high-pressure discharge. The phase immediately after breakdown of the plasma, i.e. after the actual ignition of the lamp, is particularly critical. By way of a high voltage pulse a breakdown in the discharge can be attained, it is true. However this will not suffice to attain an arc discharge. By increasing the energy fed into the lamp with the high-voltage pulse, the problem can be reduced. An increase of the amplitude of the ignition pulse, whilst maintaining the energy supplied, also has a positive effect on the ignition process. A positive effect is also obtained if the pulse repetition of the starting pulses is increased. It has then been found that a high-pressure gas discharge lamp operated with a pulsatory voltage can be ignited less readily than a lamp supplied with a 50 Hz sinusoidal voltage. An increase of the amplitude, of the energy content or of the pulse repitition frequency of the starting pulse means at any rate also an increase of the steps which must be carried out for the electronic starting circuit.

Therefore, this invention has for its object to provide a circuit arrangment for starting and operating high-pressure gas discharge lamps supplied with a pulsatory voltage, which permits a reliable ignition of the lamp both in the cold and in the hot state with simple means.

According to the invention, this object is achieved in a circuit arrangement of the kind mentioned in the opening paragraph in that the control unit switched the semiconductor switch when starting the lamp in such a manner that the duty cycle upon starting (starting duty cycle) is increased with respect to the operating duty cycle.

In the case of operation of high-pressure gas discharge lamps with a pulsatory supply current having an operating duty cycle between 0.1 and 0.7 it has been found that the starting process can be considerably simplified if the duty cycle is increased for starting the lamp and for a given time thereafter. The required increase of the duty cycle upon starting then depends upon the lamp type, the starting circuit and the operting duty cycle. However, it has been found that the starting duty cycle should be at least 0.2 higher than the operating duty cycle.

The increase of the duty cycle upon starting gives rise to a problem of the change-over of the higher starting duty cycle to the lower operating duty cycle. During the starting process, the circuit arrangement according to the invention supplies pulses having starting duty cycle. Only after the reliable ignition of the lamp, the duty cycle may return to the operating duty cycle. First a suitable time instant must be found at which the duty cycle falls back to the operating duty cycle. In fact it is not sufficient to increase the duty cycle only during the actual starting process because during the current intervals in the subsequent condition the lamp can be extinguished again more readily as these current intervals are longer. Therefore, it seems to be efficacious to maintain the starting duty cycle for at least a few seconds after the first ignition of the lamp. On the other hand, the starting duty cycle should not be maintained too long because an increase of the duty cycle in electronic ballast units (with current stabilization) is associated with an increase of the power consumption. A power consumption which is accidentally too high may lead to problems with respect to lifetime. However, also with a power stabilization during the starting phase, the duty cycle should be changed over before the stationary operating condition is attained because also when the power is kept constant, a variation of the duty cycle is associated with a variation of the colour temperature and of the flow of light.

According to a further embodiment of the circuit arrangement in accordance with the invention, the control unit therefore has a delay switch having a time constant for maintaining the starting duty cycle after ignition of the lamp for a constant period of time. Perferably, the time for which the starting duty cycle is kept at its increased value after the ignition of the lamp is about 0.5 to 60 sec. Such a predetermined time delay can be readily obtained by electronic means.

However, it would be more favourable to detect a measurable lamp property and thus to control the change-over of the duty cycle. A suitable quantity to this end, for example in high-pressure discharge lamps containing in the gaseous phase mercury and/or another metal, is the lamp operating voltage U. In fact this voltage increases in such lamps continuously after ignition until the stationary condition is attained. Accordingly to an advantageous further embodiment of the circuit arrangement in accordance with the invention, the latter is characterized in that the control unit reduces the starting duty cycle to the operating duty cycle in dependence upon a signal proportional to the lamp voltage after ignition of the lamp. Typical values of the lamp operating voltage are, for example, after ignition $U=20$ V, in the stationary condition, $U=90$ V. Since the lower value depends upon the condition of the electrodes and can therefore increase during the lifetime, in this case the duty cycle would be reduced when a voltage of about 45 V is attained.

The duty cycle can be reduced from the starting duty cycle to the operating duty cycle either jumpwise or continuously. For this purpose, the circuit arrangement according to the invention is further characterized in that the control unit then controls the periodical switching of the semiconductor switch after ignition of the lamp in such a manner that the starting duty cycle can be changed over jumpwise to the operating duty cycle.

The circuit arrangement can also be constructed so that the control unit controls the periodical switching of the semiconductor switch in such a manner that the starting duty cycle can be continuously reduced to the operating dury cycle.

the ignition of high-pressure gas discharge lamps both in the cold and in the hot state can moreover be improved in that high-voltage ignition pulses are supplied to the lamp during the starting phase. Thus, a secondary winding of an ignition transformer for producing high-voltage ignition pulses can be connected in series with the high-pressure gas discharge lamp, a primary winding of this transformer being connected to an ignition unit. The high-voltage ignition pulses are superimposed on the pulses of the normal lamp supply voltage. Preferably, two or—in dependence upon the dimensioning of the ignition circuit and the repetition frequency—several high-voltage ignition pulses are superimposed on each position or negative individual pulse. Also in this case, the ignition must not be swithced off until the lamp has reliably ignited. According to the invention, in such a circuit arrangment the ignition unit is connected to an output of the delay switch in order that the ignition unit can be swithced off after the ignition of the lamp with a delay of at least 0.1 sec.

It has proved to be efficacious not to switch off the ignition immediately at the glow-arc transition. Both with a pulsatory and with a sinusoidal supply voltage, the lamp can extinguish again in the current interval or current zero passages. Since no current flows through the lamp, the ignition begins again at least after a short delay time. If, however, in this starting phase high-voltage ignition pulses are applied to the electrodes of the lamp also when current flows through the lamp, the tendency of the arc to extinguish again can be reduced. Thus, the starting process is shortened and a reliable ignition is facilitated.

In dependence upon the condition and the kind of high-pressure gas discharge lamps, the time until the flow-arc transition takes place varies. In high-pressure sodium vapour discharge lamps, it is also possible that the arc starts on the amalgam during the starting phase and jumps to and from between the amalgam and the electrode, in which event the arc can extinguish. For immediate reignition, further high-voltage ignition pulses are then required. Dependent upon the lamp, it may therefore last more than 30 seconds before the lamp has realiably ignited and no longer requires any ignition pulses for further operation. Furthermore, it must be guaranteed that after a short drop-out of the mains the ignition begins again immediately. Therefore, it is not so favourable to determine a fixed time in which the ignition pulses are produced. It is rather more efficacious to utilize a property of the lamp itself for switching off the ignition.

According to a further advantageous embodiment of the circuit arrangement in accordance with the invention, in which additional ignition pulses are supplied to the lamp during the starting phase, the ignition unit is switched off after a predetermined value of the lamp current has been attained with a delay of at least 0.1 sec.

After the glow-arc transition, an electrical current of the order of the stationary lamp current flows through the lamp. The lamp current is therefore a quantity which is suitable for switching off the ignition. This lamp current may be measured, for example, as a voltage, which occurs across a resistor connected in series with the lamp.

In an advantageous embodiment of the circuit arrangement according to the invention, the high pressure gas discharge lamp is connected in series with a choke coil, which takes the form of a primary winding of a transformer, which has a secondary winding for producing a voltage proportional to the lamp current and which is connected to the delay switch.

The invention will now be described more fully with reference to the accompanying drawing, in which.

Figure 1:
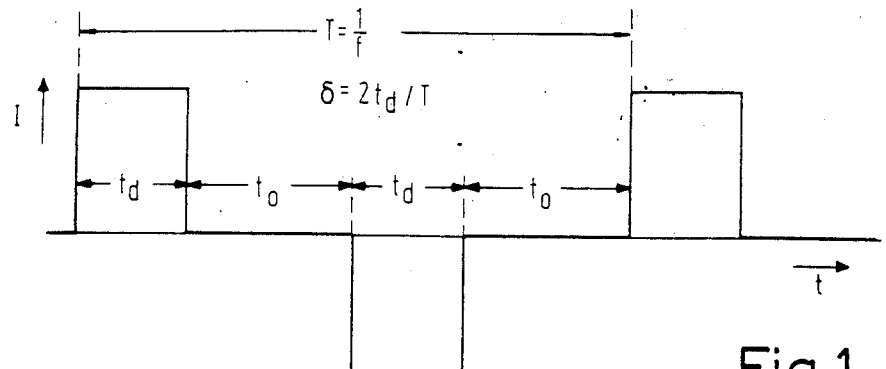
FIG. 1 shows a pulse diagram of the current with which a high-pressure gas discharge lamp can be operated.

FIG. 1 shows the pulse diagram of the bipolar supply current I of a high-pressure gas discharge lamp $t_d$ being the pulse width of the square wave pulses and $t_o$ being the pulse intervals. The duty cycle $\delta = 2t_d/T$ is then about 0.4. The pulse repetition frequency is, for example, in sodium high-pressure discharge lamps about 300 Hz. As the case may be, a higher frequency current of, for example, 30 to 70 kHz may be superimposed on the individual current pulses. The supply voltage of the lamp has the same pulse diagram.

Figure 2:
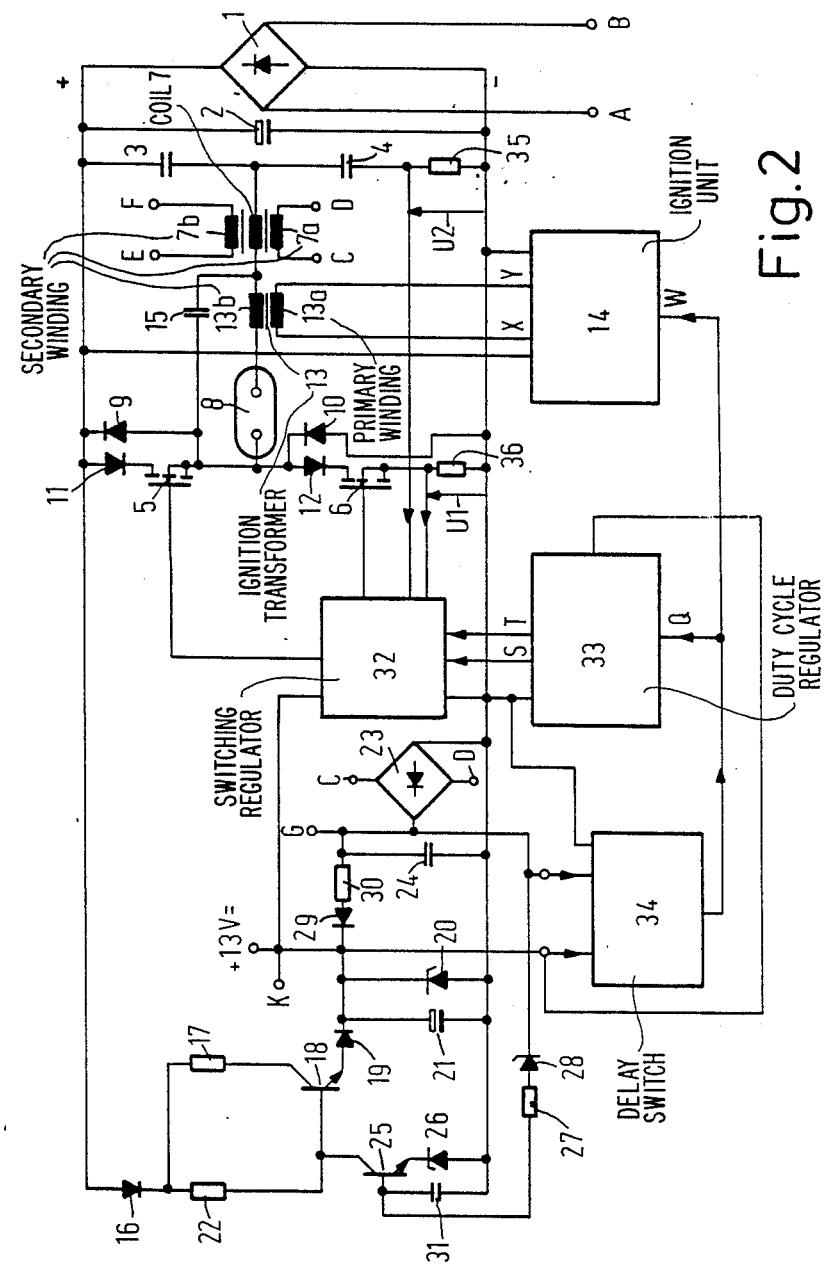
FIG. 2 shows a circuit arrangement for starting and operating a high-pressure gas descharge lamp, which is arranged in the bridge branch of a capacitive half-bridge.

In FIG. 2, A and B denote input terminals for connection to an alternating voltage source of, for example, 220 V, 50 Hz. A bridge rectifier 1 comprising four diodes is connected, as the case may be by way of a high-frequency mains filter, to said input terminals, a charging capacitor 2 being connected parrallel to the output of said rectifier.

Figure 6:
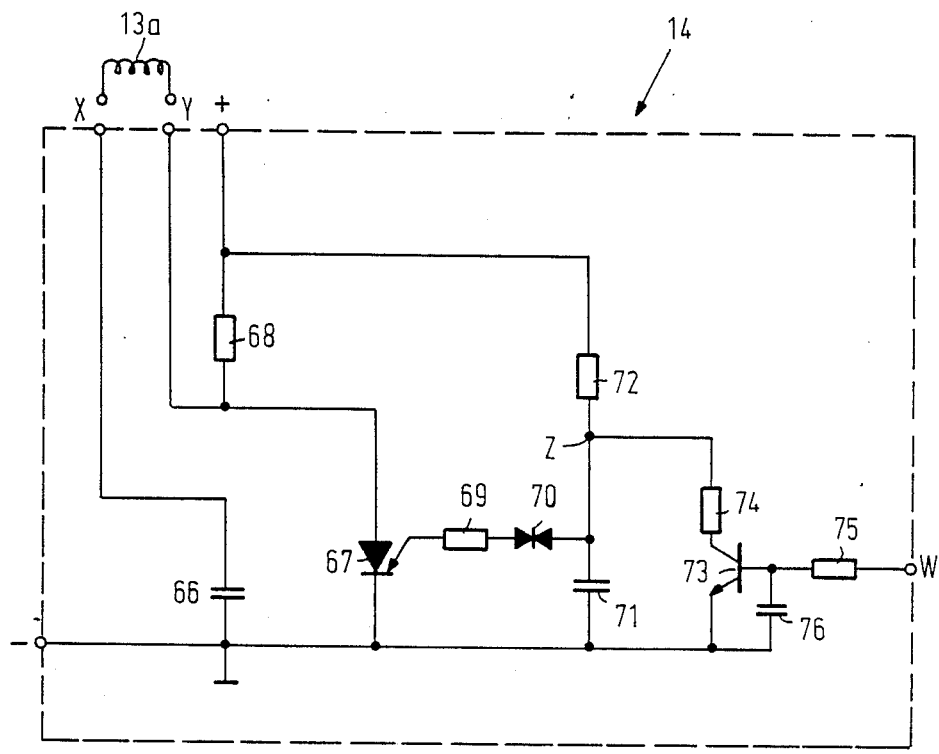
FIG. 6 shows the ignition unit used in the circuit arrangement shown in FIG. 2.

The rectifier arrangement 1, 2 constitutes a direct voltage source, to which a bridge circuit in the form of a half bridge is connected which consists of two series-connected capacitors 3 and 4 and two series-connected power field effect transistors (VMOS transistors) 5 and 6. The bridge branch of the capacitive half bridge includes a high-pressure gas discharge lamp 8 connected in series with a choke coil 7. The choke coil 7 constitutes a primary winding of a transformer. A fly-wheel diode 9 and 10, respectively, is connected parallel to each of the transistors 5 and 6 and this diode serves to shortcircuit the voltage induced in the choke coil 7 through the lamp 8 when the respective driven transistor is switched off. A respective diode 11 and 12 is connected in series with the two transistors 5 and 6; thus, fly-wheel currents are prevented from flowing through the diodes integrated in the transistors 5 and 6, as a result of which an unnecessary heating of the transistors 5 and 6 is avoided. The choke coil 7 is provided with two additional secondary windings 7a and 7b, at whose connection terminals C and D and E and F, respectively, supply voltages for the electronic control system are derived. Furthermore, a secondary winding 13b of an ignition transformer 13 is connected in series with the lamp 8 and the primary winding 13a of this transformer is connected to an ignition unit 14, which can supply ignition pulses for igniting the lamp 8 (FIG. 6). A capacitor 15, which is connected parallel across the series arrangement of the lamp 8 and of the ignition transformer 13, serves as shortcircuit capacitor for the high-voltage ignition pulses produced by the ignition transformer 13.

The supply voltage for the electronic control system is produced from the rectified mains voltage before the high-pressure gas discharge lamp 8 is ignited, comparatively high losses then occurring, however. A series arrangement comprising a diode 16, a resistor 17, a transistor 18, a diode 19 and a Zener diode 20 is then connected parallel to the charging capacitor 2. A charging capacitor 21 is connected parallel to the Zener diode 20. Across the Zener diode 20, an auxiliary supply voltage of, for example 13 V which is determined by the voltage divider comprising the elements 16 to 20, can be derived at the charging capacitor 21 at the point K. The transistor 18 is first switched to the conductive state by a resistor 22 preceding the base of the transistor 18.

After the lamp 8 has ignited, a current-dependent high-frequency voltage is produced in the secondary winding 7a of the choke coil 7. This voltage to be derived at the terminals C and D of the secondary winding 7a is supplied to a full-wave rectifier 23, a charging capacitor 24 being connected parallel to the output of said rectifier. A series arrangement comprising a transistor 25 and a Zener diode 26 is connected between the base of the transistor 18 and the minus lead. A resistor 27 in series with a Zener diode 28 is arranged between the base of the transistor 25 and the positive output of the full-wave rectifier 23. Thus, a direct voltage is obtained at the point G of the charging capacitor 24 and this voltage switches the transistor 25 to the conductive state through the resistor 27 and the Zener diode 28 after the breakdown voltage of the Zener diodes 26 and 28 has been reached. Consequently, the transistor 18 becomes non-conducting, as a result of which the process of producing the auxiliary voltage from the rectified voltage is interrupted. The voltage at the point K is now produced solely from the secondary winding 7a of the choke coil 7. The diodes 19 and 29 serve to decouple both current circuits. A resistor 30 connected between the positive output of the full-wave rectifier 23 and the diode 29 serves for current limitation of the supply voltage at the point K produced from the secondary winding 7a and the full-wave rectifier 23. A capacitor 31 connected parallel to the transistor 25 and to the Zener diode 26 is required for filtering low-frequency components (for example 300 Hz) still present.

The two field effect transistors 5 and 6 serving as semiconductor switches are controlled by means of a switching regulator 32 each by way of a driver stage. The switching regulator 32 is supplied with voltage from the secondary winding 7b of the choke coil 7. The switching regulator 32 is connected to a duty cycle regulator 33 with a clock generator 65. The duty cycle regulator 33 is in turn preceded by a delay switch 34. The duty cycle regulator 33 supplies two square-wave pulse trains, which have a fixed relative ratio and whose pulse widths are adjustable. A resistor 35 is connected in series with the two bridge capacitors 3 and 4 and a resistor 36 is connected in series with two bridge transistors 5 and 6. The voltages $U_1$ and $U_2$ that can be derived at the resistors 35 and 36 are supplied to the switching regulator 32 and serve as regulation quantities for stabilizing the lamp current. One square-wave pulse train originating from the duty cycle regulator 33 controls in conjunction with the voltage $U_2$ that can be derived at the resistor 35 by way of the switching regulator 32 the bridge transistor 5, while the second square-wave pulse train drives the bridge transistor 6 by means of the voltage $U_1$ that can be derived at the resistor 36.

The swithcing regulator 32 constitutes together with the duty cycle regulator 33 and the delay switch 34 the control unit in accordance with the invention.

Figure 4:
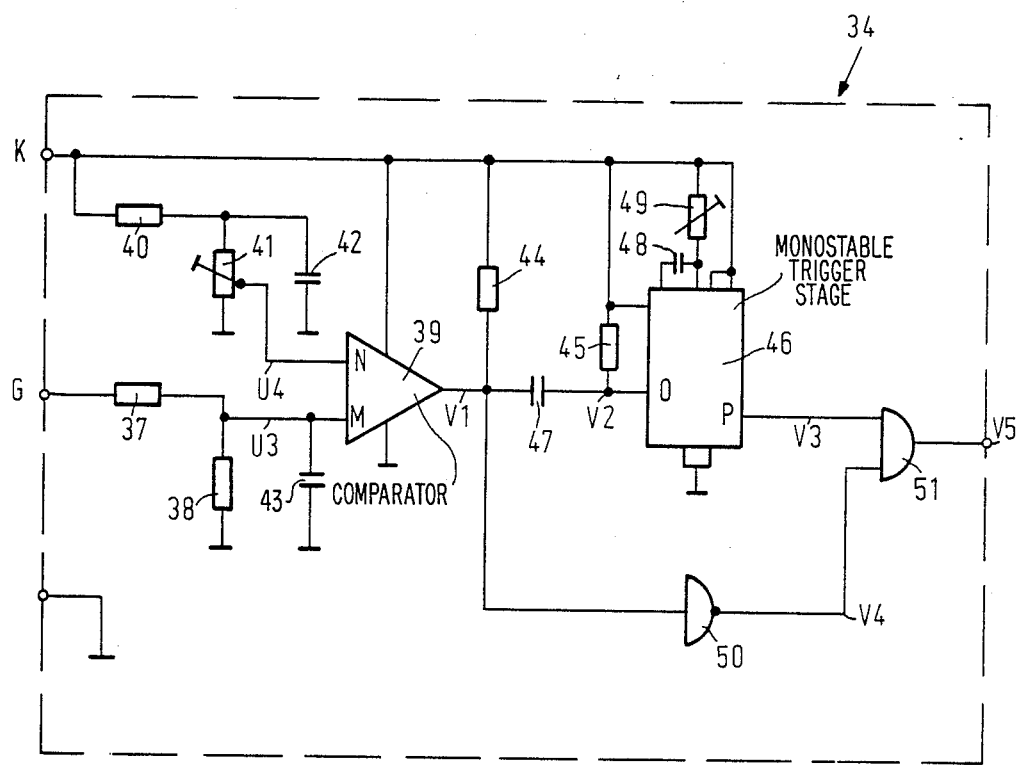
FIG. 4 shows the delay switch used in the circuit arrangement shown in FIG. 2.
Figure 5:
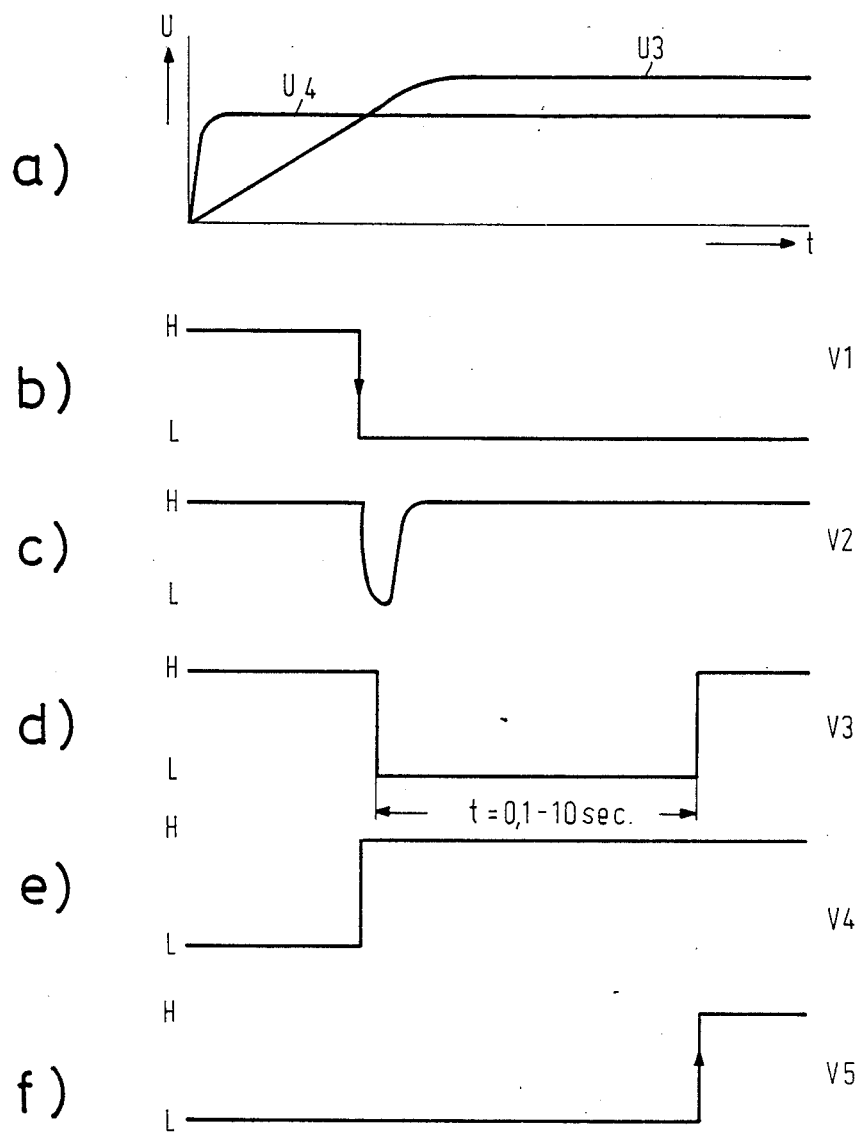
FIG. 5 shows the pulse train diagrams of the delay switch shown in FIG.4.

Details of the delay switch 34 are illustrated in FIG. 4. The voltage at the point G is connected through a voltage divider consisting of resistors 37 and 38 as voltage $U_3$ to the first input M of a comparator 39, at which it is compared with the auxiliary voltage which is produced at the point K and is supplied to the second input N of the comparator 39 through a voltage divider consisting of resistors 40 and 41 as voltage $U_4$. Capacitors 42 and 43 serve to suppress interference voltages. A resistor 44 is the working resistor of the comparator 39. A resistor 45 holds an input 0 of a succeeding monostable trigger stage 46 in the rest condition at H signal (FIG. 5b). When the voltage $U_3$ during the starting phase of the lamp 8 at the first input M of the comparator 39 exceeds the voltage $U_4$ at the second comparator input N (FIG. 5a), the output signal $V_1$ of the comparator 39 performs a H-L jump (FIG. 5b). A capacitor 47 arranged between the comparator 39 and the monostable trigger stage 46 and hence the input voltage $V_2$ of the monostable trigger stage 46 is pulled for a short time to L potential (FIG. 5e), as a result of which a H-L-H pulse $V_3$ is produced at the output P of the monostable trigger stage 46 in accordance with the time constant determined by a capacitor 48 and a resistor 49 (FIG. 5d). For the change-over of the duty cycle delayed in time, only the L-H transition is of importance. The output signal $V_1$ of the comparator 39 is further switched to the input of an inverter 50, whose output signal $V_4$ (FIG. 5e) is switched together with the output signal $V_3$ of the monostable trigger stage 46 to the inputs of an AND gate 51. Consequently, it is achieved that the output signal $V_5$ of the AND gate 51 and hence of the delay switch 34 remains at L signal until the L-H transition of the monostable trigger stage 46 takes place (FIG. 5f). In FIG. 5, the pulse train diagrams of the delay switch 34 are shown.

The L-H transition is now utilized to switch in the duty cycle regulator 33 (FIG. 3) the duty cycle from the starting duty cycle to the stationary operating duty cycle. As clock generator 65, use was made of the element TL 494 CN of Texas Instr. Its pulse repetition frequency is determined by the capacitor 52 and the voltage that can be derived at the voltage divider consisting of the resistors 53 and 54. The capacitors 55, 56 and 57 prevent influences of interference voltages. Before the lamp 8 starts, the signal $V_5$, which originates from the delay switch 34 and is supplied to the input Q of the duty cycle regulator 33 is at L potential. In this case, a negligibly small voltage is applied to the control input K for the duty cycle of the duty cycle regulator 33. Since a field effect transistor 58 persent in the duty cycle regulator 33 is still switched to the high-ohmic state, the voltage is determined by the division ratio of the resistors 59, 60 and 61. As soon as the lamp 8 has ignited, an L-H transition takes place with the adjusted delay time at the input Q of the duty cycle regulartor 33 with this H signal, the transistor 58 is swithced by way of a resistor 62 to the conductive state. The control voltage derived at the potentiometer resistor 61 and supplied to the input of the clock generator 65 now increases in accordance with the division ratio of the resistors 59, 61, which leads to a reduction of the duty cycle of the output signals at the outputs S and T. Signals now occur at the output resistors 63 and 64 by which the two bridge transistors 5 and 6 are controlled through the switching regulator 32.

The signal $V_5$ originating from the delay switch 34 is moremver supplied to the input W of the ignition unit 14, whose switching and operating mode will now be described with reference to FIG. 6.

The terminals of the ignition unit 14 designated by plus and minus are connected to the output of the bridge rectifier 1 (FIG. 2). The terminals X and Y are connected to the primary winding 13a of the ignition transformer 13. A pulse capacitor 66 is arranged between the terminal X and the minus connection. A thyristor 67 is connected between the terminal Y and the minus tereminal and this thyristor is connected by way of a resistor 68 to the plus terminal. The ignition electrode of the thyristor 67 is adjoined by a resistor 69 and a diac 70, which is connected on the one hand through a capacitor 71 to the minus terminal and through a resistor 72 to the plus terminal. A series arrangement comprising a transistor 73 and a resistor 74 is connected parallel to the capacitor 71. The base of the transistor 73 is connected through a resistor 75 to the input W of the ignition unit 14. A capacitor 76 between the base and the emitter of the transistor 73 serves to suppress the interference voltages.

As already stated, the input W of the ignition unit 14 is connected to the ouput of the delay switch 34. Before the lamp starts, L potential is applied to the input W of the ignition unit 14 (FIG. 5f). The transistor 73 is thus switched by way of the resistor 75 to the non-conductive state. The pulse capacitor 66 is charged through the resistor 68 and the primary winding 13a of the ignition transformer 13. Through the resistor 72, the capacitor 71 is charged until the threshold voltage of the diac 70 (about 30 V) is attained. The diac 70 then breaks down so that the discharging current of the capacitor 71 ignites the thyristor 67 through the resistor 69. This thyristor passes to its conductive state so that the pulse capacitor 66 charged through the resistor 68 is now discharged through the primary winding 13a of the ignition transformer 13 between the connections X and Y, as a result of which a high-voltage ignition pulse is produced in the secondary winding 13b of the ignition transformer 13. After each ignition pulse, the thristor 67 is switched automatically again to its non-conductive state.

The L-H transition in the delay switch 34 is determinative of the time-delayed switching-off of the ignition unit (FIG. 5f). The ignition process is in fact repeated until the transistor 73 is swithced to the conductive state by the transition from the L signal to the H signal at the input W of the ignition unit 14. As a result, the potential at the point Z between the resistor 72 and the capacitor 71 is pulled below the threshold voltage of the disc 70, so that the ignition pulses are switched off.

In an embodiment for starting and operating a 30 W sodium high-pressure discharge lamp with bipolar pulses, the pulse train frequency was 300 Hz, on which a voltage of higher frequency between 30 and 70 kHz was superimposed. The starting duty cycle was adjusted to about 0.7 and the operating duty cycle was adjusted to about 0.5. The elements used had the following values:

| with reference to FIG. 2 | |
| --- | --- |
| field effect transistor 5 | IRF730 or 830 |
| field effect transistor 6 | IRF730 or 830 |
| diodes 9, 10 | DSR 5500x |
| diodes 11, 12 | BYV95C |
| diodes 16, 19, 29 | B$^Y$V95C |
| full-wave rectifier 23 | S1WB |
| bridge rectifier 1 | B250 C1500/1000 |
| Zener diode 20 | BZX79/C13 |
| Zener diode 26 | BZX79C10 |
| Zener diode 28 | BZX79C4V7 |
| transistor 18 | MJ340 |
| transistor 25 | BC107 |
| chokecoil 7 | 2 mH |
| ignition trafo 13 | U-Kern (U15/11/E6) |
| measuring resistor 36 | 1 Ohm |
| measuring resistor 35 | 1 Ohm |
| resistor 22 | 180 KOhm |
| resistor 17 | 4.7 kOhm |
| resistor 27 | 12 kOhm |
| resistor 30 | 100 Ohm |
| capacitor 3 | 3 × 1.5 μF |
| capacitor 4 | 3 × 1.5 μF |
| capacitor 15 | 22 nF |
| capacitor 31 | 1 μF |
| capacitor 21 | 47 μF |
| capacitor 24 | 0.22 μF |
| capacitor 2 | 47 μF/385 V |

Figure 3:
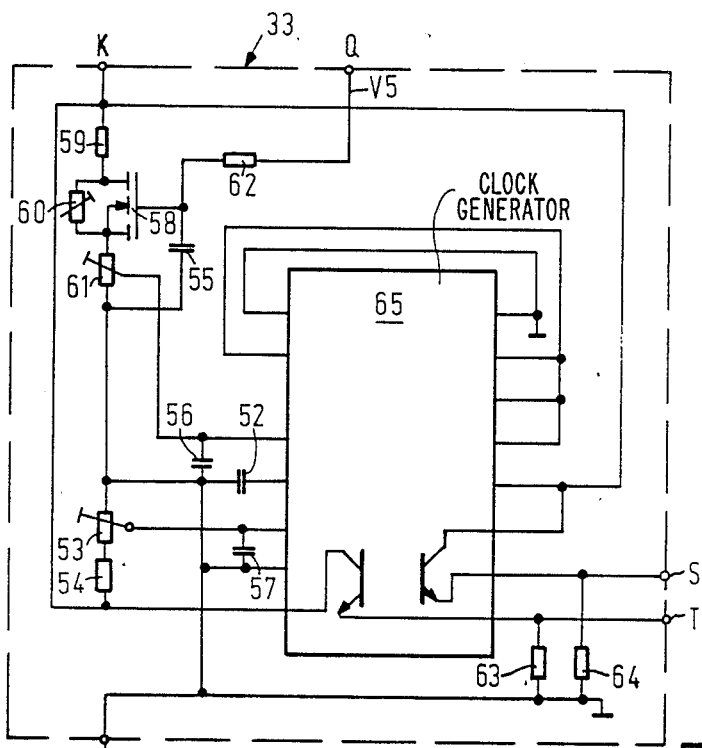
FIG. 3 shows the duty cycle regulator with clock generator used in the circuit arrangement shown in FIG. 2.

| with reference to FIG. 3 | | |
| --- | --- | --- |
| clock generator 65 | TL 494 CN | Texas Instr. |
| transistor 58 | VN 88 AF | Siliconix |
| resistor 59 | 10 KOhm | |
| resistor 60 | 220 KOhm | |
| resistor 61 | 2.2 KOhm | |
| resistor 53 | 2.2 KOhm | |
| resistor 54 | 10 KOhm | |
| resistor 62 | 100 KOhm | |
| resistor 63 | 5.6 KOhm | |
| resistor 64 | 5.6 KOhm | |
| capacitor 55 | 1 μF | |
| capacitor 56 | 68 nF | |
| capacitor 52 | 120 nF | |
| capacitor 57 | 68 nF | |

| with reference to FIG. 4 | | |
| --- | --- | --- |
| resistor 40 | 100 KOhm | |
| resistor 37 | 100 KOhm | |
| resistor 38 | 4.7 KOhm | |
| resistor 41 | 10 KOhm | |
| resistor 45 | 100 KOhm | |
| resistor 49 | 1 MOhm | |
| resistor 44 | 10 KOhm | |
| capacitor 42 | 1 μF | |
| capacitor 43 | 1 μF | |
| capacitor 47 | 0.1 μF | |
| capacitor 48 | 2.2 μF | |
| comparator 39 | LM393 | Valvo |
| monostable trigger stage 46 | ½ HEF 4538 | Valvo |
| gate 51 | ¼ HEF 4081 | Valvo |
| gate 50 | 1/6 4049 | Valvo |

| with reference to FIG. 6 | |
| --- | --- |
| resistor 68 | 22 KOhm |
| resistor 72 | 180 KOhm |
| resistor 69 | 18 Ohm |
| resistor 74 | 3.3 KOhm |
| resistor 75 | 33 KOhm |
| capacitor 66 | 0.1 μF |
| capacitor 71 | 47 nF |
| capacitor 76 | 0.1 μF |

-continued

| with reference to FIG. 6 | | |
| --- | --- | --- |
| Diac 70 | BR100 | Valvo |
| thyristor 67 | BT151 | Valvo |
| transistor 73 | BC 107 | Valvo |

What is claimed is:

1. A circuit arrangement for starting and operating a high-pressure gas discharge lamp wherein said circuit arrangement comprises a control unit and voltage converter means comprising at least one semiconductor switch, which can be periodically switched to the conductive and to the non-conductive state by said control unit in such a manner that the lamp receives a pulsatory supply current having an operating duty cycle in the operating condition between 0.1 and 0.7, and wherein said control unit (32,33,34) switches the semiconductor switch (5,6) upon starting of the lamp in such a manner that the starting duty cycle upon starting is increased with respect to the operating duty cycle.

2. A circuit arrangement as claimed in claim 1, characterized in that the starting duty cycle exceeds the operating duty cycle by at least 0.2.

3. A circuit arrangement as claimed in claim 1 or 2, characterized in that the control unit (32, 33, 34) comprises a delay switch (34) having a time constant for maintaining the starting duty cycle after ignition of the lamp (8) for a predetermined time.

4. A circuit arrangement as claimed in claim 1 or 2, characterized in that the control unit (32, 33, 34) reduces the starting duty cycle to the operating duty cycle in dependence upon a signal proportional to the lamp voltage after the ignition of the lamp (8).

5. A circuit arrangement as claimed in claim 1 or 2, characterized in that the control unit (32, 33, 34) controls the periodical switching of the semiconductor switch (5, 6) after the ignition of the lamp (8) in such a manner that the starting duty cycle can then be readjusted in a steplike manner to the operating duty cycle.

6. A circuit arrangement as claimed in claim 1 or 2, characterized in that the control unit (32, 33, 34) controls the periodical switching of hte semiconductor switch (5, 6) in such a manner that the starting duty cycle can be reduced continuously to the operating duty cycle.

7. A circuit arrangement as claimed in claim 3, in which a secondary winding (13b) of an ignition transformer (13) for producing high-frequency ignition pulese is connected in series with the high-pressure gas discharge lamp (8) and a primary winding (13a) of this transformer is connected to an ignition unit (14), characterized in that the ignition unit (14) is connected to an output of the delay switch (34) in order that the ignition unit can be switched off after the ignition of the lamp with a delay of at least 0.1 sec.

8. A circuit arrangement as claimed in claim 3, characterized in that the ignition unit can be swithced off with a delay of at least 0.1 sec after a given value of the lamp current has been attained.

9. A circuit arrangement as claimed in claim 8, characterized in that a choke coil (7) is connected in series with the high-pressure gas discharge lamp (8) and takes the form of the primary winding of a transformer, which has a secondary winding (7a) for producing a voltage proportional to the lamp current said seconary winding being connected to the delay switch (34).

10. A circuit arrangement as claimed in claim 3, characterized in that the control unit (32, 33, 34) controls the periodical switching of the semiconductor switch (5, 6) after the ignition of the lamp (8) in such manner that the starting duty cycle can then be readjusted, in a steplike manner to the operating duty cycle.

11. A circuit arrangement as claimed in claim 4, characterized in that the control unit (32, 33, 34) controls the periodical swithcing of the semiconductor switch (5, 6) after the ignition of the lamp (8) in such a manner that the starting duty cycle can then be readjusted, in a steplike manner to the operating duty cycle.

12. A circuit arrangement as claimed in claim 3, characterized in that the control unit (32, 33, 34) controls the periodical switching of the semiconductor swithc (5, 6) in such a manner that the starting duty cycle can be reduced continuously to the operating duty cycle.

13. A circuit arrangement as claimed in claim 4, characterized in that the control unit (32, 33, 34) controls the periodical switching of the semiconductor switch (5, 6) in such a manner that the starting duty cycle can be reduced continuously to the operating duty cycle.

14. A circuit arrangement as claimed in claim 4, in which a secondary winding (13b) of an ignition transformer (13) for producing high-frequency ignition pulses is connected in series with the high-pressure gas discharge lamp (8) and a primary winding (13a) of this transformer is connected to an ignition unit (14), characterized in that the ignition unit (14) is connected to an output of the delay switch (34) in order that the ignition unit can be swithced off after the ignition of the lamp with a delay of at least 0.1 sec.

15. A circuit arrangement as claimed in claim 7, characterzed in that the ignition unit can be switched off with a delay of at least 0.1 sec after a given value of the lamp current has been attained.

* * * * *